UNITED STATES PATENT OFFICE.

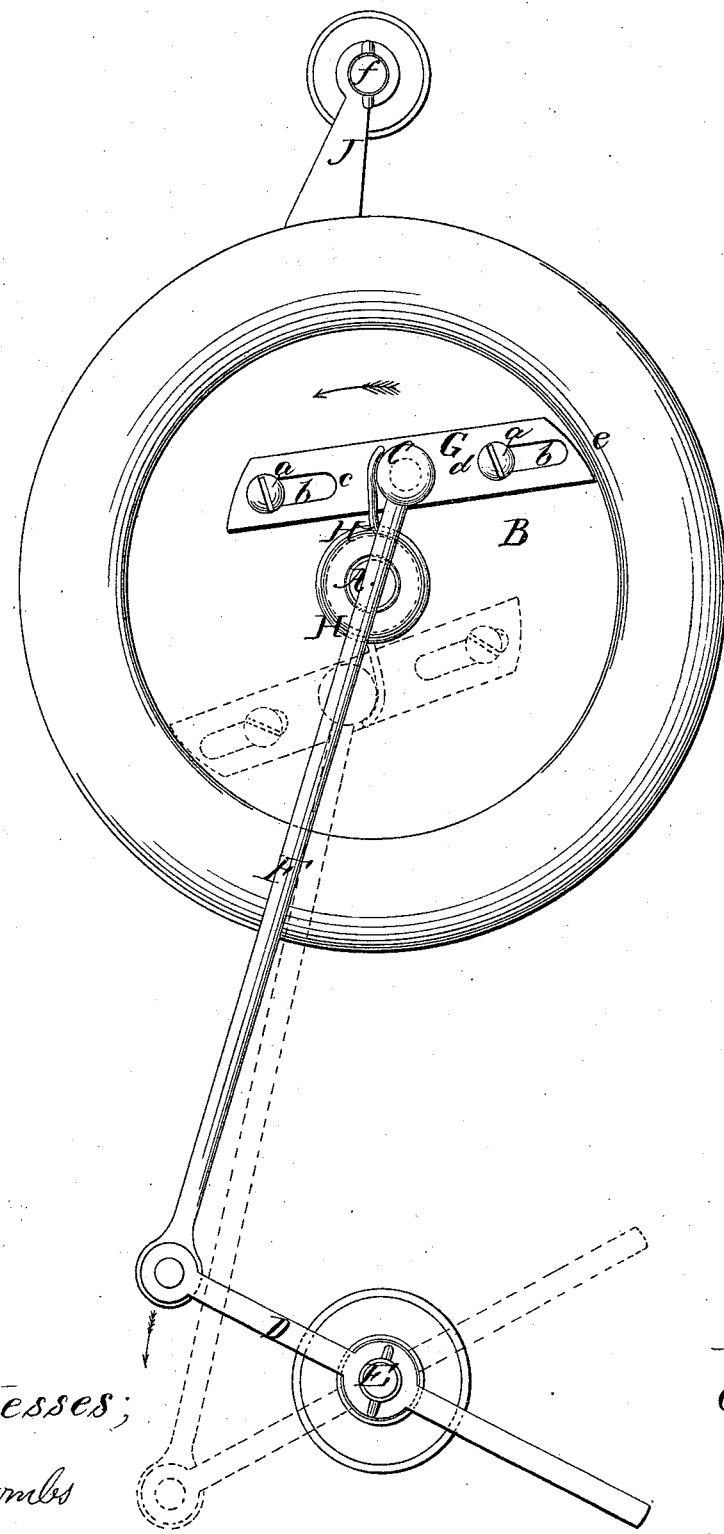

E. P. BROWNELL, OF EAST HADDAM, CONNECTICUT.

IMPROVEMENT IN CRANK-MOTIONS.

Specification forming part of Letters Patent No. 34,735, dated March 25, 1862.

*To all whom it may concern:*

Be it known that I, E. P. BROWNELL, of East Haddam, in the county of Middlesex and State of Connecticut, have invented a new and useful Improvement in the Crank-Motion; and I do hereby declare that the following is a full, clear, and exact description of the same, reference being had to the accompanying drawing, forming part of this specification, said drawing representing a side view of a treadle and crank motion with my improvement.

The object of this invention is to facilitate the passage of the crank-wrist beyond the points commonly known in the crank-motion as "dead-points;" and to this end it consists in so applying the wrist, in combination with a spring and stop, that it shall be capable of a movement independently of the crank-shaft in a direction oblique to the line occupied by the pitman when the wrist is at either of the above-mentioned points.

To enable others to make and apply my invention, I will proceed to describe its construction and operation.

A is the crank-shaft, having fast upon it the fly-wheel B, to which the crank-wrist C is attached.

D is the treadle, working upon the fixed fulcrum E, or fast to a rock-shaft.

F is the pitman, connecting the treadle with the wrist C.

The crank-wrist, instead of being rigidly secured to the fly-wheel, is secured to a longitudinally-slotted guide, G, which is attached to one side of the wheel by screws *a a*, passing through its slots *b b* and screwed into the wheel, and is so arranged that when the wrist is in either of the two positions represented in black and red outline, commonly known as the "dead-points," the said slide occupies a position oblique to the pitman, the part *c*, which is in front of the wrist, considered relatively to the direction in which the crank is desired to revolve, and which is indicated by an arrow, being nearer to the shaft than the part *d* behind the wrist. The slots *b b* permit the slide to move longitudinally upon the screws *a a*.

To the hub of the wheel there is secured one end of the coiled spring H, the other end of which presses against the wrist C in such manner as to tend to hold back the slide against the rim *e* of the wheel which constitutes the slot. The spring H is strong enough to transmit from the wrist to the shaft the power necessary to drive it in all positions but at or very near the dead-points.

The wheel B has applied to it a pawl, J, to prevent it from rotating in the wrong direction. This pawl has a V-shaped face, which enters a groove of corresponding form in the periphery of the wheel, and the pin *f*, on which it is hung, is so situated that the friction of the wheel upon it tends to raise and free it as the wheel rotates in the desired direction, but to make it jam into the groove and stop the wheel when any tendency of the latter to rotate it the opposite direction occurs.

The operation is as follows: Pressure applied to the treadle on opposite sides of the fulcrum E or rock-shaft produces the revolution of the crank-wrist and through it of the wheel and shaft. The spring H holds back the slide G in contact with the stop *e* during the greater part of the revolution; but as the wrist arrives at the points which are commonly dead-points and the pressure on the treadle is reversed, if any tendency of the wrist to stop occurs the pressure on the treadle transmitted through the pitman to the wrist overcomes the backward pressure of the spring H, causes the slide G to move forward with the wrist until the latter has "passed the center" so far that the continued pressure acts upon it to produce the revolution, after which the spring forces back the slide against the stop *e* and holds it there till it is again required to move forward therefrom.

When it is not convenient to attach the crank-wrist to a fly-wheel, it may be attached to a plate which is fast to the shaft, and the oblique sliding attachment may be made in other ways than that described—as, for instance, the wrist itself may be arranged to slide in the same direction in an oblique slot or upon an obliquely-arranged guide, and the spring may be applied in a different form, and the stop may be of other form or construction instead of being constituted by the rim *e*.

This invention is more especially adapted for sewing-machines or other machines worked by treadles, but is also applicable to machinery in which the power transmitted to the crank is obtained by other means than a treadle.

What I claim as my invention and desire to secure by Letters Patent, is—

The combination of an obliquely-sliding wrist-pin, a spring, and a stop, the whole applied in combination with the crank-shaft and pitman, to operate substantially as and for the purpose herein specified.

E. P. BROWNELL.

Witnesses:
ISAAC ACKLEY,
THOS. C. BORDMAN.